United States Patent
Wang et al.

(10) Patent No.: US 9,342,642 B1
(45) Date of Patent: *May 17, 2016

(54) STATISTICAL OPTIMIZATION IN PLACE-AND-ROUTE

(71) Applicant: Atoptech, Inc., Santa Clara, CA (US)

(72) Inventors: Yu-Cheng Wang, Cupertino, CA (US); Wei-Shen Wang, Taipei (TW)

(73) Assignee: Atoptech, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/316,438

(22) Filed: Jun. 26, 2014

Related U.S. Application Data

(63) Continuation of application No. 14/028,145, filed on Sep. 16, 2013, now Pat. No. 8,806,412.

(60) Provisional application No. 61/820,610, filed on May 7, 2013.

(51) Int. Cl.
*G06F 17/50* (2006.01)
*G06F 9/455* (2006.01)

(52) U.S. Cl.
CPC .................................. *G06F 17/505* (2013.01)

(58) Field of Classification Search
CPC ............ G06F 17/5031; G06F 2217/84; G06F 17/505; G01R 31/31725
USPC ......................... 716/108, 113–114, 134, 136
See application file for complete search history.

(56) References Cited

U.S. PATENT DOCUMENTS

| | | | | |
|---|---|---|---|---|
| 7,487,475 B1 * | 2/2009 | Kriplani | .............. | G06F 17/5031 702/182 |
| 7,555,740 B2 * | 6/2009 | Buck | .................... | G06F 17/5031 716/134 |
| 8,281,267 B2 * | 10/2012 | Komatsu | ............. | G06F 17/5031 703/16 |

\* cited by examiner

*Primary Examiner* — Nghia Doan
(74) *Attorney, Agent, or Firm* — Van Pelt, Yi & James LLP

(57) ABSTRACT

Place-and-route (P&R) includes maintaining a set of local arrival time information and local required time information associated with a circuit layout; determining a candidate fix on a critical path in the circuit layout; statistically determining, using one or more computer processors, a set of one or more adjusted local slacks associated with a region affected by the candidate fix; and in the event that the set of one or more adjusted local slacks indicates that the candidate fix results in a timing improvement, accepting the candidate fix.

20 Claims, 4 Drawing Sheets

STATISTICAL OPTIMIZATION IN PLACE-AND-ROUTE

CROSS REFERENCE TO OTHER APPLICATIONS

This application is a continuation of co-pending U.S. patent application Ser. No. 14/028,145, entitled STATISTICAL OPTIMIZATION IN PLACE-AND-ROUTE filed Sep. 16, 2013 which is incorporated herein by reference for all purposes, which claims priority to U.S. Provisional Patent Application No. 61/820,610 entitled STATISTICAL OPTIMIZATION IN PLACE AND ROUTE filed May 7, 2013 which is incorporated herein by reference for all purposes.

BACKGROUND OF THE INVENTION

Imperfections in semiconductor manufacturing processes result in variations in components (e.g., cells) on a chip. Some existing design tools account for such variations, referred to as on-chip variations (OCVs). For example, instead of assuming that a path has a constant delay, some existing design tools specify a timing range that characterizes the maximum or the minimum delay of a cell. As the feature size of the chip decreases, the amount of OCVs proportionally increases. Existing design tools typically make more pessimistic assumptions in order to anticipate the worst case scenario. As a result, the entire design is penalized.

Moreover, different layout context (such as different locations on the cell) may lead to different delays. Some design tools rely on a mapping table that maps different layout contexts to different delay times, and look up the appropriate delay based on the layout. However, the values used in the mapping table still tend to be based on pessimistic assumptions and tend to penalize the entire design.

Existing place-and-route (P&R) tools typically rely on static timing analysis based on the most pessimistic assumptions. Some tools employ mean values of the components but still use pessimistic assumptions when evaluating whether the layout meets the timing constraints. The resulting layout is therefore often suboptimal.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A place-and-route (P&R) technique is described. In some embodiments, a set of local arrival time information and local required time information associated with a circuit layout is maintained. A candidate fix on a critical path in the circuit layout is determined. A set of one or more adjusted local slacks associated with a region affected by the candidate fix is determined. The candidate fix is accepted if the set of adjusted local slacks indicates that the candidate fix results in a timing improvement to the circuit layout.

Figure 1:
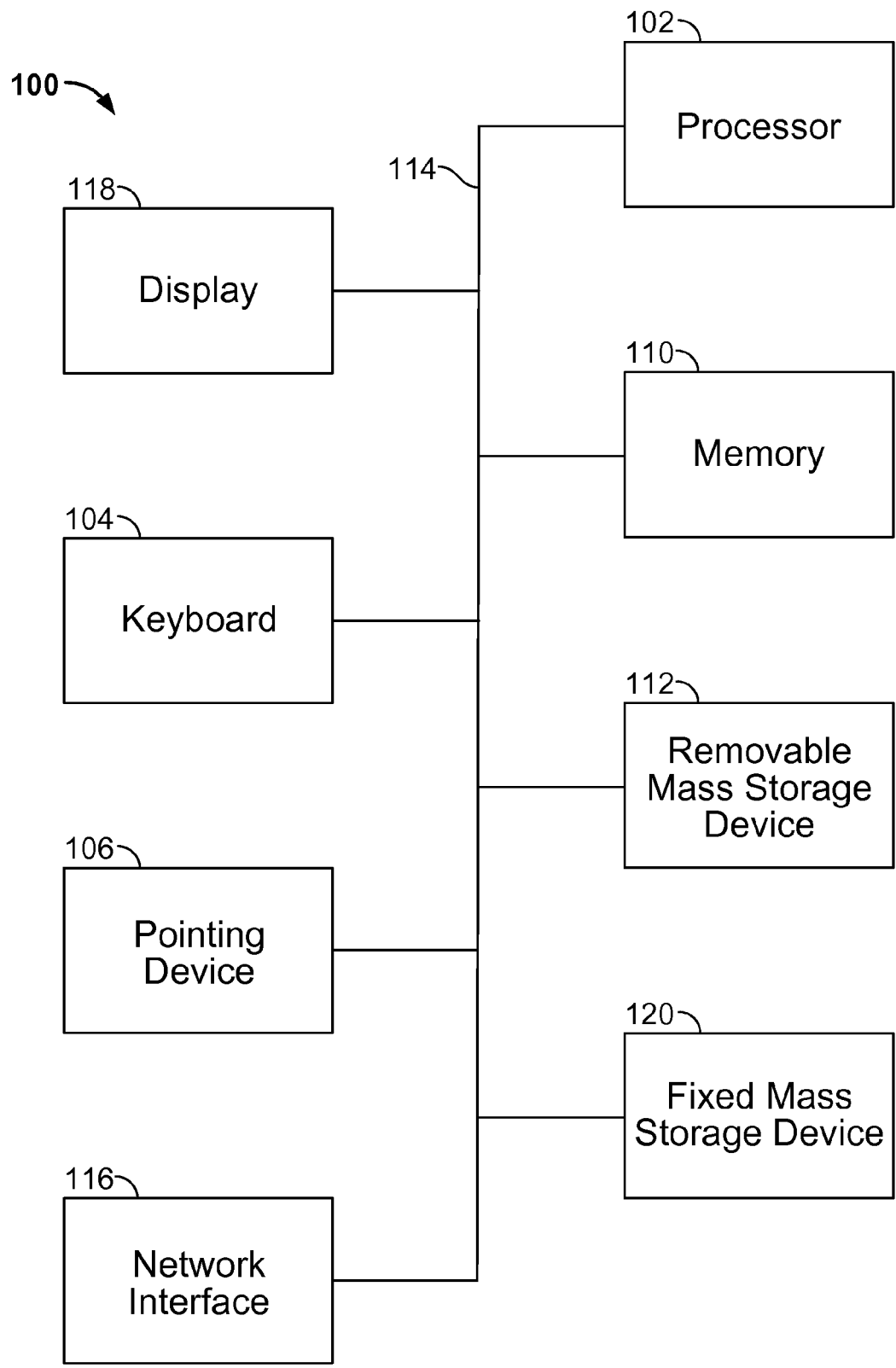
FIG. 1 is a functional diagram illustrating a programmed computer system for performing statistical P&R in accordance with some embodiments.

FIG. 1 is a functional diagram illustrating a programmed computer system for performing statistical P&R in accordance with some embodiments. As will be apparent, other computer system architectures and configurations can be used to perform statistical P&R. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to perform the processes described below.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
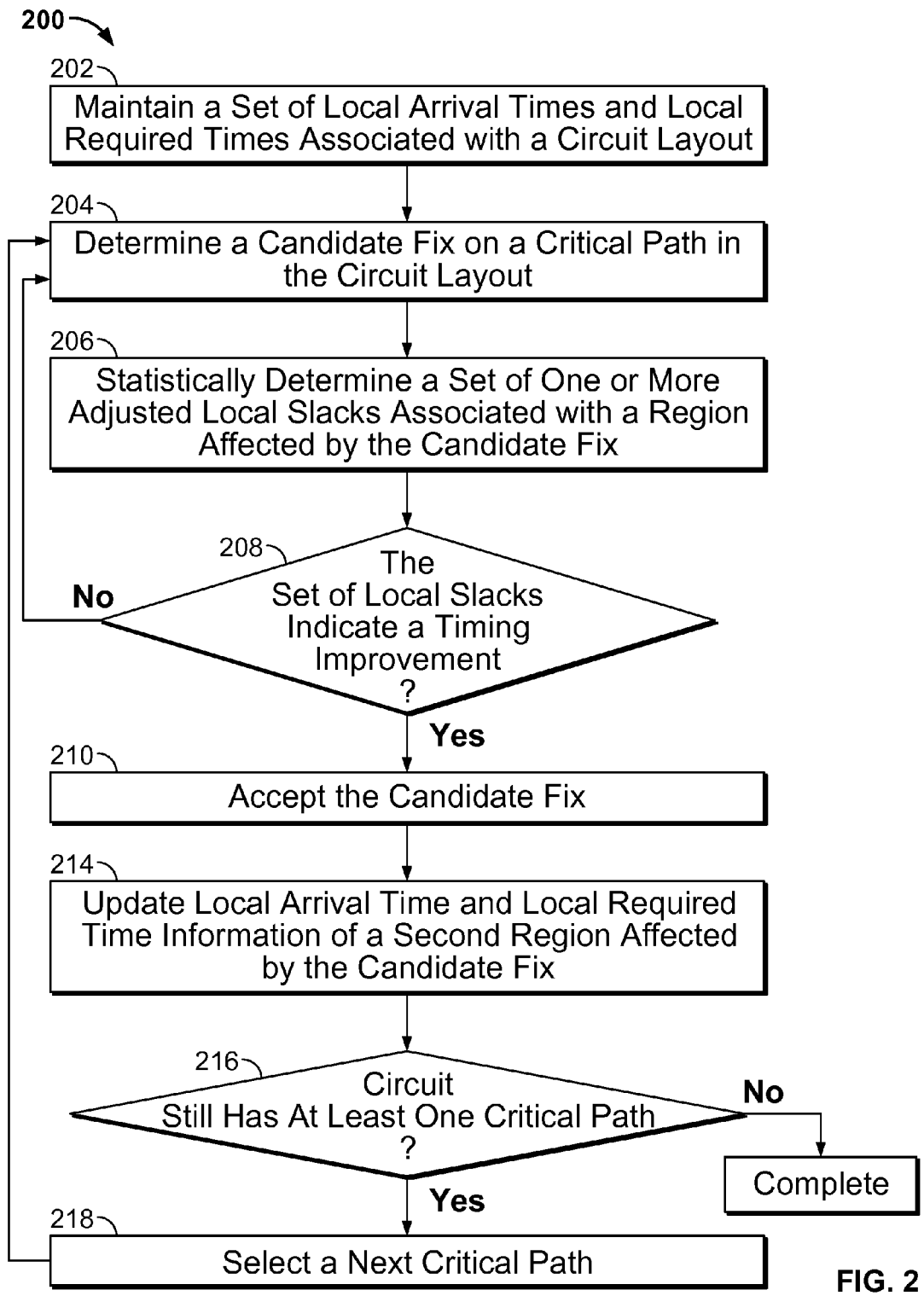
FIG. 2 is a flowchart illustrating an embodiment of a statistical P&R process that performs one or more logical fixes to a circuit layout.

FIG. 2 is a flowchart illustrating an embodiment of a statistical P&R process that performs one or more logical fixes to a circuit layout. Process 200 may be performed on a system such as 100 of FIG. 1.

At 202, a set of local arrival time information and local required time information associated with the circuit layout is maintained. In some embodiments, the circuit layout is a design netlist that is loaded into a P&R program. Information pertaining to local arrival time and local required time include statistical information such as the mean and the variance of the local arrival time, and the mean and the variance of the local required time. Examples of local arrival time and local required time are explained in greater detail below in connection with the example circuit shown in FIG. 3. In some embodiments, the local arrival time information and local required time information are maintained at locations between cells in the circuit layout, such as at the input pins and/or output pins of cells. As will be described in greater detail below, by maintaining the local arrival time and local required time and updating as appropriate, timing information at any given point of interest on the circuit can be quickly computed to facilitate timing improvements through logical fixes to the circuit layout.

At 204, a critical path on the circuit layout is obtained. As used herein, a path that has a timing violation is deemed to be a critical path. Any appropriate critical path identification techniques can be used. In some embodiments, slack values of individual paths are determined, and a path having a slack value that does not meet a threshold is deemed to have a timing violation and therefore a critical path. As used herein, required time refers to time needed to reach the end point of a path, arrival time refers to the delay from the clock source to the end point of the path, and path slack refers to the difference between required time and arrival time of the end point of a path. In some embodiments, the path with the lowest path slack is selected as the critical path to which a candidate fix should be made. In some embodiments, a statistical technique similar to what is described below is used to compute the slack and identify the critical path. In some embodiments, a non-statistical method such as traditional static timing analysis is used to make the identification of the critical path. In some embodiments, both statistical and non-statistical techniques are applied.

Continuing on at 204, a candidate fix on the critical path is determined. As used herein, a candidate fix refers to a logical fix to the circuit that can be made by the P&R tool. Examples of logical fixes include changing the size of a cell, adding one or more buffers, replacing a cell with a different cell with greater driving strength, local area logic resynthesis, etc.

On a given path, there are a number of candidate locations where different types of logical fixes can take place. While it is possible to compute all combinations of potential fixes and their resulting timing improvements to select the best fix that will result in the greatest timing improvement, out of efficiency considerations, in some embodiments, the candidate fix is determined by applying a set of rules. For example, the rules may specify that the candidate fix be made at the cell immediately before there is fanout, and that the cell be enlarged to twice its current size. Many other appropriate rules may be applied based on design preferences.

In some embodiments, the set of rules includes a cost (or benefit) function that determines locally the impact of the candidate fix. For example, when a cell is enlarged, there is positive impact to timing, but negative impact to power consumption, circuit area, location congestion, etc. The factors are considered together to formulate a cost (or benefit) function that reflects the total cost (or benefit) of a particular fix. The fix that achieves the lowest cost value (or the highest benefit value) is selected as the candidate fix. In some embodiments, a number of potential fixes are evaluated and ranked based on their respective scores so a next best candidate fix can easily be identified at a later time. In some embodiments, the scores include WNS (worst negative slack), TNS (total negative slack), DRV (design rule violation), etc.

In some embodiments, the candidate fix selection is made in multiple stages. For example, a first set of rules are applied to determine a candidate location that will likely result in the most timing improvements with the least cost, and a second set of rules are applied to determine the type of logical fix to be made at the candidate location that will likely result in the most timing improvements with the least cost. Cell size, wire load, candidate location on the path, etc., may be used as inputs to the first set of rules, and the type of logical fix may be used as inputs to the second set of rules.

At 206, a region that is affected by the candidate fix is determined, and a set of one or more adjusted local slacks associated with the affected region is determined statistically. In some embodiments, the region affected by the candidate fix includes portions of the critical path that are in proximity to the candidate fix, portions of paths that fan out from the candidate fix, and/or portions of unconnected paths whose timing is affected by the candidate fix (e.g., a path whose capacitance is changed due to the candidate fix). In various embodiments, different combinations of criteria are used to determine the affected region based on design requirements and preferences. In some embodiments, a threshold value is set, and a path (or a portion thereof) is only included in the affected region if the changes due to the candidate fix exceed the threshold value. For example, a slack threshold is set, and a portion of the path including the candidate fix is only included if the adjusted local slack is below the slack threshold. As another example, a threshold capacitance value is set, and an unconnected path is only included in the affected region if its change in capacitance due to the candidate fix is greater than the threshold capacitance value. As will be described in greater detail below, the slack values are statistically determined based at least in part on the local arrival times and the local required times resulting from the candidate fix. In particular, statistical values such as mean slack values, variances associated with the local arrival times of points of interest, variances associated with the local required times of points of interest, etc., are used to determine the slack values.

At 208, it is determined whether the set of adjusted local slacks indicates that the candidate fix results in a timing improvement in the affected region. If the candidate fix results in a timing improvement, it is accepted and applied to the circuit layout, at 210. Otherwise, the optimization changes are discarded and the process returns to 204 to obtain a next candidate fix, and steps 206-208 are repeated. For example, in some embodiments, the adjusted local slacks for locations in the affected region are added and the sum is compared with the sum of the original unadjusted local slacks at the same locations. If the adjusted sum is less than the original sum, then the candidate fix results in a timing improvement, and should be incorporated into the circuit layout.

At 214, the local arrival times and local required times of a second region affected by the candidate fix are updated. The second region can be determined using techniques similar to those used to determine the first region. In some embodiments, the criteria used to include paths in the second region are more inclusive than those used to determine the first region (for example, a smaller capacitance change threshold can be used to determine whether an unconnected path whose capacitance is changed due to the candidate fix should be included in the second affected region), resulting in a second region that is greater than the first region. If computing local slacks based on a first affected region to determine whether to accept a candidate change is performed, then by updating the arrival times and required times in a second greater region, the P&R tool achieves high computation efficiency.

At 216, it is determined whether the updated circuit still has critical paths. As discussed above, statistical and/or non-statistical techniques can be used to make the determination. If one or more critical paths exist, a next critical path is selected at 218, and steps 204-216 are repeated. If there are no more critical paths, the process completes.

Figure 3:
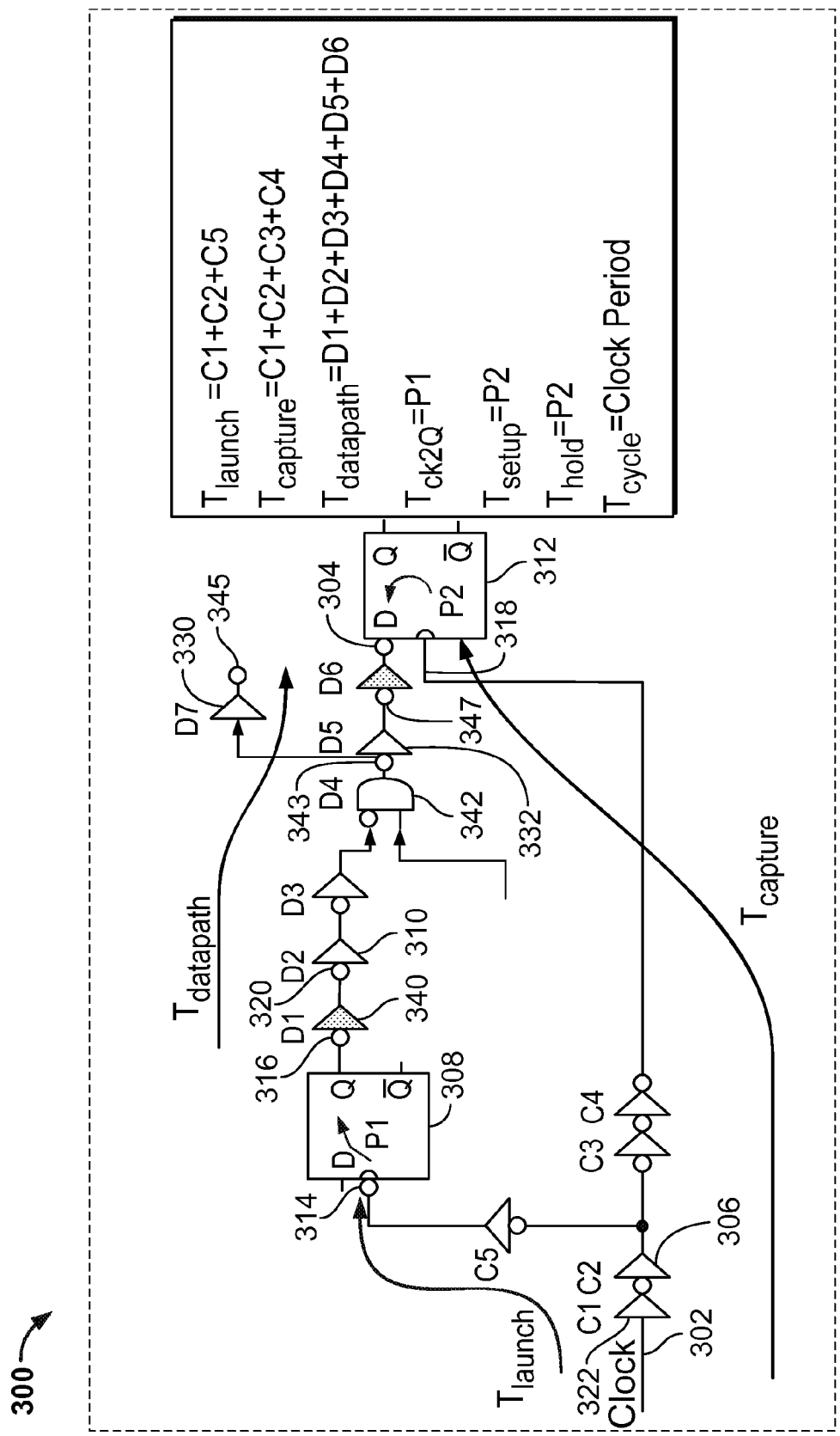
FIG. 3 is an example circuit diagram used to illustrate the statistical P&R process of 200.

FIG. 3 is an example circuit diagram used to illustrate the statistical P&R process of 200. Example circuit diagram 300 comprises a plurality of circuit components referred to as cells. Specifically, sequential cells (also referred to as P cells) such as 308 and 312 are cells with memory, and combinational cells (also referred to as D cells) such as cells 306 and 310 are cells without memory. Examples of sequential cells include flip-flops, latches, etc., and examples of combinational cells include buffers, inverters, logical gates, etc. The delay attributed to each cell is labeled next to the corresponding cell. For example, the delays attributed to cells 306, 308, 310, and 312 are labeled as C2, P1, D2, and P2, respectively.

Referring to 202 of FIG. 2, in this example, local arrival times and local required times are maintained at input/output pins to cells (shown as circles such as 316, 320, etc.). As used herein, a local arrival time at a point of interest refers to the delay from the clock source to the point of interest. A local required time refers to the timing constraint for the clock to reach the point of interest, which is equal to the total required time (i.e., the time required for the clock to reach the end point of the path) minus delays of cells on the path subsequent to the point of interest.

As used herein, a data path refers to a portion of the circuit between two sequential cells. A clock path refers to the portion of the circuit from the clock source to the first sequential cell. A critical path is computed based on data paths and optionally on clock paths. In this example, the path between sequential cells 308 and 312 is a data path. The circuit may include many other data paths, such as the data path that includes gate 330 (the sequential cell that terminates this data path is not shown).

Referring to 204 of FIG. 2, to determine whether the data path between cells 308 and 312 is a critical path, a timing analysis of the path is performed. In some embodiments, the timing analysis is non-statistical (also referred to as a static timing analysis). In some embodiments, the timing analysis is statistical.

In non-statistical timing analysis, a single delay value (such as the mean delay value) is used for a particular point or portion on the path. Referring again to FIG. 3, portions of the path are drawn on the diagram, and delays corresponding to the path portions are specified.

Specifically, the launch path refers to the path from the start of the clock to the clock pin of the starting cell on the data path. The delay associated with the launch path from node 302 to node 314 of starting cell 308 is specified as:

$$T_{launch} = C1 + C2 + C5 \quad (1)$$

The capture path refers to the path from the start of the clock to the clock pin of the ending cell on the data path. The delay associated with the capture path from node 302 to node 318 is specified as:

$$T_{capture} = C1 + C2 + C3 + C4 \quad (2)$$

The delay associated with the data path from node 316 to node 304 is specified as:

$$T_{datapath} = D1 + D2 + D3 + D4 + D5 + D6 \quad (3)$$

Further, the delay from the clock pin to the Q pin of path-starting-cell 308 is:

$$T_{ck2Q} = P1 \quad (4)$$

The timing constraint from the clock pin to the data pin of path-ending-cell 312 is:

$$T_{setup} = P2 \quad (5)$$

The hold time for path-ending-cell 312 is:

$$T_{hold} = P2 \quad (6)$$

$$T_{cycle} = \text{clock period} \quad (7)$$

The timing of the path between the input clock (node 302) and the input pin of the ending cell (node 304) is subject to a setup check and a hold check. Specifically, the static setup check requires that:

$$T_{launch} + T_{ck2Q} + T_{datapath} < T_{capture} + T_{cycle} - T_{setup} \quad (8)$$

The left hand side of inequality (8) is the arrival time, which corresponds to the delay from the clock input to the end of the path. The right hand side of inequality (8) is the required time, which corresponds to the timing constraint for the clock to reach the end of the path.

The static hold check requires that:

$$T_{launch} + T_{ck2Q} + T_{datapath} > T_{capture} + T_{hold} \quad (9)$$

If either the setup check or the hold check fails, the data path is deemed to be a critical path.

Unlike the non-statistical timing analysis which uses a single value to represent a cell delay, in statistical timing analysis, cell delay is modeled as a normal random variable with a statistical distribution, as follows:

$$d \sim N(E(d), \text{Var}(d)) \quad (10)$$

where d represents the cell delay; E(d) represents the mean delay (also referred to as the expected delay or nominal delay); and Var(d) represents the variance of the delay, which is also represented as $\sigma^2$, where $\sigma$ is the standard deviation.

Figure 4:
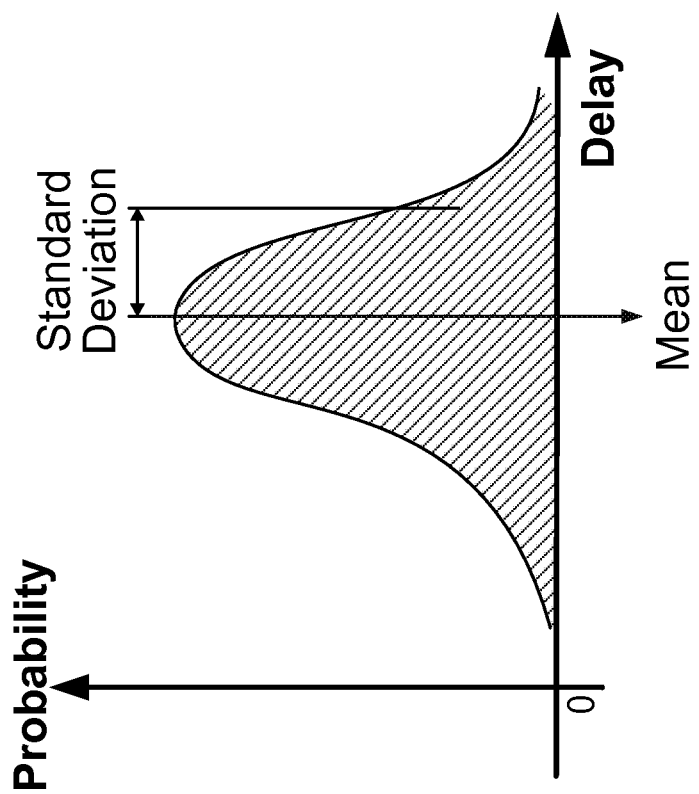
FIG. 4 is a diagram illustrating an example normal distribution of cell delay due to on-chip variations.

FIG. 4 is a diagram illustrating an example normal distribution of cell delay due to on-chip variations. The delay value is expressed probabilistically. For example, assuming that cell variations are mutually independent, the probability that delay values fall within $E(d) \pm 3\sigma$ is 99.87%.

In addition to cell delay, net delay, required time (required_time), arrival time (arrival_time), and slack (slack) can each be represented using a mean and a variance. Assuming that the OCVs of cells are mutually independent, the sum of delays also has normal distribution. Thus, mean and variance can be propagated to end pins of the path, and sum of the delays also have a normal distribution. In other words, given that:

$$D = \Sigma_1^N d_i \quad (11)$$

where the overall path delay D is the sum of delays of path portions $d_1, d_2, \ldots, d_N$, the mean and variance of D can be expressed as follows:

$$E(D) = \Sigma_1^N E(d_i) \quad (12)$$

$$\text{Var}(D) = \Sigma_1^N \text{Var}(d_i) \quad (13)$$

To perform statistical setup check at the end point of the path (e.g., pin 304 of FIG. 3), the mean delay is expressed as follows:

$$E(\text{end\_point}) = E(T_{capture}) + E(T_{cycle}) - E(T_{setup}) - E(T_{launch}) - E(T_{ck2Q}) - E(T_{datapath}) \quad (14)$$

The variance of the delay is expressed as follows:

$$\text{Var}(\text{end\_point}) = \text{Var}(T_{capture}) + \text{Var}(T_{cycle}) + \text{Var}(T_{setup}) + \text{Var}(T_{launch}) + \text{Var}(T_{ck2Q}) + \text{Var}(T_{datapath}) \quad (15)$$

Referring to 204 of process 200, to determine whether a path is a critical path having a timing violation, the setup check determines whether the slack at the end point of the path is greater than 0, as follows:

$$\text{slack} = E(\text{end\_point}) - n\_\text{sigma} * \text{sqrt}(\text{Var}(\text{end\_point})) > 0 \quad (16)$$

where n_sigma is configurable by the user of the P&R program to meet a desired requirement level, such as a level of confidence the user wishes to achieve in meeting the timing requirement. For example, when n_sigma=3, if the inequality of (16) holds, the probability that timing is met is greater than 99.87%.

In this case, for purposes of illustration, the data path shown in FIG. 3 is determined to be a critical path. Thus, a logical fix should be made to this path to improve timing.

Referring to 204 of process 200, a candidate fix is determined for the critical path. As discussed above, the candidate fix is determined based on a set of rules. For purposes of illustration, it is assumed that the candidate fix is made at cell 310 and the cell is enlarged.

Referring to 206 of process 200, a set of one or more adjusted local slacks associated with a region affected by the candidate fix is statistically determined. In this case, for purposes of illustration, the affected region includes the input pin of cell 310 (i.e., node 320).

Before statistical local slack determination is described, non-statistical (also referred to as static) local slack determination is first described. For node 320, the local arrival time is:

$$\text{arrival\_time} = C1 + C2 + C5 + P1 + D1 \quad (18)$$

The local required time is propagated from the end of the path back through the cells subsequent to the point of interest. In other words, the local required time is determined by subtracting from the total required time of the path delays of cells subsequent to node 320:

$$\text{required\_time} = C1 + C2 + C3 + C4 + T_{cycle} - P2 - D6 - D5 - D4 - D3 - D2 \quad (19)$$

The local static slack is specified as follows:

$$\text{slack} = \text{required\_time} - \text{arrival\_time} \quad (20)$$

As discussed above, when performing statistical timing check, cell delay is modeled using a corresponding statistical distribution which is expressed as a normal distribution with a mean and a variance. As will be shown in detail below, the slack at a given point on the path can also be expressed statistically.

At a given point on the path, the mean value of the slack is determined on the mean values of the required_time and arrival_time at this point, as follows:

$$E(\text{slack})=E(\text{required\_time})-E(\text{arrival\_time}) \quad (21)$$

Referring to FIG. 3 for example, the E(required_time) and E(arrival_time) at node 320 are computed as follows:

$$E(\text{arrival\_time})=E(C1)+E(C2)+E(C5)+E(P1)+E(D1) \quad (22)$$

$$E(\text{required\_time})=E(C1)+E(C2)+E(C3)+E(C4)+T_{cycle}-(E(P2)+E(D6)+E(D5)+E(D4)+E(D3)+E(D2)) \quad (23)$$

In some embodiments, the determination of slack variance at a given point requires derating of the cell delays. Derating refers to a pessimistic estimation of what the delay might be, such as an estimation based on the assumption that a cell has worse delay than its mean. Specifically, a more pessimistic estimation for a cell on the launch path corresponds to a longer delay, and a more pessimistic estimation for a cell on the capture path corresponds to a shorter delay. However, if a cell is shared by the launch path and the capture path, the estimated delay cannot both be longer and shorter than the mean. Thus, in some embodiments, the variance of the slack is determined based at least in part on derated cell delays that take into account cells shared by the launch path and the capture path. Specifically, a Clock Re-convergence Pessimism Removal time value (denoted as CRPR_time) is used when computing the variance of the slack in order to give a more reasonable and not overly pessimistic estimation.

Three embodiments of slack calculation based on statistical values are described. Other variations of statistical slack calculation are possible.

One embodiment is referred to as the "launch_clock+capture_clock+data" mode. In this embodiment, the variance of arrival time (Var(arrival_time)) and the variance of required time (Var(required_time)) are both expressed as the sum of the cell variances.

Referring to the example of FIG. 3, at the input to D2 (node 320), the variances are expressed as:

$$\text{Var}(\text{arrival\_time})=\text{Var}(C1)+\text{Var}(C2)+\text{Var}(C5)+\text{Var}(P1)+\text{Var}(D1) \quad (24)$$

$$\text{Var}(\text{required\_time})=\text{Var}(C1)+\text{Var}(C2)+\text{Var}(C3)+\text{Var}(C4)+\text{Var}(P2)+\text{Var}(D6)+\text{Var}(D5)+\text{Var}(D4)+\text{Var}(D3)+\text{Var}(D2) \quad (25)$$

Since cells 322 and 306 (C1 and C2) are shared by the launch path and the capture path, the variance of CRPR_time takes into account the variances of these cells by summing them:

$$\text{Var}(\text{CRPR\_time})=\text{Var}(C1)+\text{Var}(C2) \quad (26)$$

The variance of the slack is expressed as follows:

$$\text{Var}(\text{slack})=\text{Var}(\text{required\_time})+\text{Var}(\text{arrival\_time})-\text{Var}(\text{CRPR\_time}) \quad (27)$$

The derated statistical slack at a given point on the path is computed as follows:

$$\text{slack}=E(\text{slack})-n\_\text{sigma}*\text{sqrt}(\text{Var}(\text{slack})) \quad (28)$$

Thus, based on equations (21)-(28), the slack value is computed based on the mean values and variance values of cell delays.

Another embodiment is referred to as the "launch_clock+data and capture_clock" mode. In this embodiment, the variance of arrival_time is still expressed as the sum of the cell variances (e.g., equation 24 for the example of FIG. 3). The variance of required_time (Var(required_time)) is separated into two portions: one portion attributed to the data path associated with the critical path (Var(required_time_data)), and another portion attributed to the capture path associated with the critical path (Var(capture_clock)), expressed respectively as follows:

$$\text{Var}(\text{required\_time\_data})=\text{Var}(D6)+\text{Var}(D5)+\text{Var}(D4)+\text{Var}(D3)+\text{Var}(D2)+\text{Var}(P2) \quad (29)$$

$$\text{Var}(\text{capture\_clock})=\text{Var}(C1)+\text{Var}(C2)+\text{Var}(C3)+\text{Var}(C4) \quad (30)$$

Cells 322 and 306 are shared by the launch path and the capture path. In this case, the variance of CRPR_time (Var(crpr_time)) is also separated into two portions: a portion attributed to the launch path (Var(launch_crpr)) and another portion attributed to the capture path (Var(capture_crpr)).

$$\text{Var}(\text{launch\_crpr})=\text{Var}(C1)+\text{Var}(C2) \quad (31)$$

$$\text{Var}(\text{capture\_crpr})=\text{Var}(C1)+\text{Var}(C2) \quad (32)$$

Note that while typically Var(C1) and Var(C2) associated with launch_crpr are the same as Var(C1) and Var(C2) associated with capture_crpr, in some embodiments, the user can set the values to be different.

A "launch_clock+data" variance Var(launch_clock_data) is specified as:

$$\text{Var}(\text{launch\_clock\_data})=\text{Var}(\text{arrival\_time})+\text{Var}(\text{required\_time\_data})-\text{Var}(\text{launch\_crpr}) \quad (33)$$

In this embodiment, the statistical slack is calculated as follows:

$$\text{slack}=E(\text{slack})-n\_\text{sigma}*\text{sqrt}(\text{Var}(\text{launch\_clock\_data}))-n\_\text{sigma}*\text{sqrt}(\text{Var}(\text{capture\_clock})-\text{Var}(\text{capture\_crpr})) \quad (34)$$

Another embodiment is referred to as the "launch_clock and capture_clock and data" mode. In this embodiment, the variance of the arrival time (Var(arrival_time)) is separated into two portions: a portion attributed to the data path associated with the critical path (Var(arrival_time_data)) and another portion attributed to the launch path associated with the critical path (Var(launch_clock)). Referring to the example of FIG. 3, the variances at node 320 are expressed as:

$$\text{Var}(\text{arrival\_time\_data})=\text{Var}(P1)+\text{Var}(D1) \quad (35)$$

$$\text{Var}(\text{launch\_clock})=\text{Var}(C1)+\text{Var}(C2)+\text{Var}(C5) \quad (36)$$

The variance of required time (Var(required_time)) is separated to a data portion (Var(required_time_data)) and a capture clock portion (Var(capture_clock)) in a similar manner as the embodiment described above, according to equations (29) and (30). The variance of CRPR_time (Var(crpr_time)) is also separated into two portions: Var(launch_crpr) attributed to the launch path and Var(capture_crpr) attributed to the capture path as described above according to equations (31) and (32).

In this embodiment, the statistical slack is calculated as follows:

$$\text{slack} = E(\text{slack}) - n\_\text{sigma} * \text{sqrt}(\text{Var}(\text{arrival\_time\_data}) + \text{Var}(\text{required\_time\_data})) - n\_\text{sigma} * \text{sqrt}(\text{Var}(\text{launch\_clock}) - \text{Var}(\text{launch\_crpr})) - n\_\text{sigma} * \text{sqrt}(\text{Var}(\text{capture\_clock}) - \text{Var}(\text{capture\_crpr}))$$ (37)

Referring to 208-210 of process 200, if, at node 320, the adjusted local slack based on enlarged cell 310 is greater than the original local slack based on original cell 310, then the candidate fix has resulted in timing improvement, and is accepted and incorporated into the circuit.

According to 214 of process 200, local arrival time and local required time information of a second region affected by the candidate fix are updated. In the example of FIG. 3, the second region includes the data path between cells 308 and 312, as well as any fanout paths. As shown, node 320 has a single fanout comprising a single load (cell 310).

At a given node with a single fanout, such as at the input pin of a cell such as 340, the mean required time is the difference between the mean required time at the output pin of the cell and the mean delay of the cell:

$$E(\text{input\_required\_time}) = E(\text{output\_required\_time}) - E(\text{delay})$$ (38)

The variance of required time at the input pin of the cell is computed as the variance of the output pin plus the variance of the cell (represented as $\sigma^2$):

$$\text{Var}(\text{input\_required\_time}) = \text{Var}(\text{output\_required\_time}) + \sigma^2$$ (39)

Since an output pin of one cell is connected to the input pin of a subsequent cell, the required time variance at a node of interest can be computed based on the variance of the end of the path propagated back to the node of interest by adding the variance of the subsequent cells.

For purposes of illustration, suppose the candidate fix is made at cell 342, which has two fanouts to cells 330 and 332, respectively. The candidate fix impacts the timing for both fanout paths. The required times corresponding to the fanout paths will likely be different. The adjusted local slacks should account for the difference.

Required time propagation on fanout paths is first explained using a non-statistical example. Referring to FIG. 3, to compute the required time at node 343, required time values corresponding to the multiple fanout paths are determined and compared, and the path that leads to the most pessimistic estimation (i.e., the shortest required time) is selected as the path to propagate required time. Using a non-statistical method, the required time at node 343 is selected among required times of paths through nodes 345 and 347:

$$\text{Required\_time\_343} = \min((\text{Required\_time\_345} - D7), (\text{Required\_time\_347} - D5))$$ (38)

With statistical OCV, different paths may have different variances and the required time alone is not sufficient to decide which path should be selected for propagation of required time. In some embodiments, at a point of interest that corresponds to a fanout location, statistical slack values of different fanout paths are computed and compared using any of the techniques described above, and the fanout path resulting in the least statistical slack is selected to propagate the arrival time and required time from the end point of the path to the point of interest, and to update the local arrival time and local required time at the point of interest. The following code is an example implementation used to determine the required time.

```
float slack=FLOAT_MAX;
float required_time_nom=FLOAT_MAX;  //expected required time
float required_time_var=FLOAT_MAX; //var of required time
for (each fanout) {
// the expected required time at the input of a cell is the
// difference between the expected required time at the output
// of the cell (output_required_time_nom) and the expected delay
// of the cell (delay_nom):
    input_required_time_nom=output_required_time_nom-delay_nom
// the variance of required time at the input of a cell is the
// variance at the output of the cell (output_required_time_var)
// and the variance of the delay of the cell (delay_std^2):
    input_required_time_var=output_required_time_var+delay_std^2
// statistical slack is calculated. CalcSlack is a function
// implementing any of the statistical slack calculation methods
// previously described.
    statistic slack=CalcSlack(input_arrival_time_nom,
        input_arrival_time_var,
        input_required_time_nom,
        input_required_time_var)
// choose the path with the smallest slack to propagate required
// time
    if (statistic slack<slack) {
        required_time nom=input_required_time_nom;
        required_time_var=input_required_time_var;
    }
}
```

Referring again to process 200 at 214 and to FIG. 3, once the local arrival times and the local required times of the nodes on circuit 300 are updated, the circuit is reevaluated to determine if a critical path still exists (216 of FIG. 2). If so, the critical path is selected, and the process repeats until all critical paths on the circuit meet the timing requirement.

A P&R technique that determines statistical slack associated with a candidate fix has been described. The technique more accurately models on-chip variations in circuit layout, and allows logical fixes to the circuit to improve timing to be performed efficiently.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
    maintaining a set of local arrival time information and local required time information associated with a circuit layout;
    determining a candidate fix on a critical path in the circuit layout;
    determining an affected circuit portion that is affected by the candidate fix, wherein the affected circuit portion includes an affected path or a portion of an affected path that has a timing-related value that is changed due to the candidate fix, and that the change in the timing-related value due to the candidate fix exceeds a threshold;
    statistically determining a set of one or more adjusted local slacks associated with the affected circuit portion, wherein the set of one or more adjusted local slacks associated with the affected circuit portion is statistically determined based on one or more of: a variance of an arrival time associated with the affected circuit portion, a variance of a required time associated with the affected circuit portion, or a variance of a Clock Re-convergence Pessimism Removal (CRPR) time associated with the affected circuit portion; and in the event that the set of one or more adjusted local slacks indicates that the candidate fix results in a timing improvement, accepting the candidate fix.

2. The method of claim 1, wherein statistically determining the set of one or more adjusted local slacks associated with the affected circuit portion includes identifying the affected path or the portion of the affected path.

3. The method of claim 1, wherein the timing-related value includes a slack value.

4. The method of claim 1, wherein the timing-related value includes a capacitance value.

5. The method of claim 1, wherein the set of one or more adjusted local slacks associated with the affected circuit portion is determined based at least in part on a set of one or more local arrival times and a set of one or more local required times resulting from the candidate fix.

6. The method of claim 1, wherein the affected circuit portion includes a portion of the critical path that is in proximity to the candidate fix.

7. The method of claim 1, wherein the affected circuit portion includes a portion of a fanout path that fans out from the candidate fix.

8. The method of claim 1, wherein the affected circuit portion includes a portion of an unconnected path whose timing is affected by the candidate fix.

9. The method of claim 1, wherein an adjusted local slack associated with the affected circuit portion is statistically determined based at least in part on mean values and variance values of cell delays.

10. A system comprising:
one or more processors configured to:
   maintain a set of local arrival time information and local required time information associated with a circuit layout;
   determine a candidate fix on a critical path in the circuit layout;
   determine an affected circuit portion that is affected by the candidate fix, wherein the affected circuit portion includes an affected path or a portion of an affected path that has a timing-related value that is changed due to the candidate fix, and that the change in the timing-related value due to the candidate fix exceeds a threshold;
   statistically determine a set of one or more adjusted local slacks associated with the affected circuit portion, wherein the set of one or more adjusted local slacks associated with the affected circuit portion is statistically determined based on one or more of: a variance of an arrival time associated with the affected circuit portion, a variance of a required time associated with the affected circuit portion, or a variance of a Clock Re-convergence Pessimism Removal (CRPR) time associated with the affected circuit portion; and
   in the event that the set of one or more adjusted local slacks indicates that the candidate fix results in a timing improvement, accept the candidate fix; and one or more memories coupled to the one or more processors and configured to provide the one or more processors with instructions.

11. The system of claim 10, wherein to statistically determine the set of one or more adjusted local slacks associated with the affected circuit portion includes to identify the affected path or the portion of the affected path.

12. The system of claim 10, wherein the timing-related value includes a slack value.

13. The system of claim 10, wherein the timing-related value includes a capacitance value.

14. The system of claim 10, wherein the set of one or more adjusted local slacks associated with the affected circuit portion is determined based at least in part on a set of one or more local arrival times and a set of one or more local required times resulting from the candidate fix.

15. The system of claim 10, wherein the affected circuit portion includes a portion of the critical path that is in proximity to the candidate fix.

16. The system of claim 10, wherein the affected circuit portion includes a portion of a fanout path that fans out from the candidate fix.

17. The system of claim 10, wherein the affected circuit portion includes a portion of an unconnected path whose timing is affected by the candidate fix.

18. The system of claim 10, wherein an adjusted local slack associated with the affected circuit portion is statistically determined based at least in part on mean values and variance values of cell delays.

19. A computer program product embodied in a non-transitory computer readable storage medium and comprising computer instructions for:
maintaining a set of local arrival time information and local required time information associated with a circuit layout;
determining a candidate fix on a critical path in the circuit layout;
determining an affected circuit portion that is affected by the candidate fix, wherein the affected circuit portion includes an affected path or a portion of an affected path that has a timing-related value that is changed due to the candidate fix, and that the change in the timing-related value due to the candidate fix exceeds a threshold;
statistically determining a set of one or more adjusted local slacks associated with the affected circuit portion, wherein the set of one or more adjusted local slacks associated with the affected circuit portion is statistically determined based on one or more of: a variance of an arrival time associated with the affected circuit portion, a variance of a required time associated with the affected circuit portion, or a variance of a Clock Re-convergence Pessimism Removal (CRPR) time associated with the affected circuit portion; and
in the event that the set of one or more adjusted local slacks indicates that the candidate fix results in a timing improvement, accepting the candidate fix.

20. The method of claim 1, wherein the affected circuit portion for which the set of one or more adjusted local slacks is determined is included in the critical path.

* * * * *